United States Patent Office 2,739,162
Patented Mar. 20, 1956

2,739,162

HYDROGENATION OF CHLOROPREGNENES

John M. Chemerda, Metuchen, N. J., assignor to Merck & Co., Inc., Rahway, N. J., a corporation of New Jersey No Drawing. Application January 25, 1954, Serial No. 406,071

12 Claims. (Cl. 260—397.4)

This invention relates to the hydrogenation of pregnenes and particularly to the catalytic hydrogenation of pregnenes having chloro-substituents to produce the corresponding chloro-substituted pregnanes.

The catalytic hydrogenation of the double bond in pregnenes to produce pregnanes convertible into hormones is known in the prior art. As an example, in United States Patent No. 2,352,852, issued to Russell Eark Marker on July 4, 1944, there is disclosed the process for the conversion of $\Delta^{16}$-20-keto-pregnene derivatives to the corresponding 20-keto pregnane by mild catalytic hydrogenation. This hydrogenation process, however, has not heretofore been applied to chloro-substituted pregnenes to produce the corresponding chloro-substituted pregnane because of the belief that mild catalytic hydrogenation would not only reduce the double bond, but would also cause the removal of the chloro-substituents with the formation of the corresponding saturated hydrocarbon.

In accordance with the present invention, it has been discovered that $\Delta^{16}$-pregnenes having chloro-substituents attached to the cyclopentanopolyhydrophenanthrene or cholane nucleus and particularly at the 5 and 6 carbon atoms may be catalytically hydrogenated without removing the chloro-substituents to produce the corresponding chloro-substituted pregnane in nearly quantative yield. This discovery provides a simple, effective and economical method for the preparation of pregnanes having chloro-substituents.

In accordance with one embodiment of this invention in which the process is particularly effective, a $\Delta^{16}$-5,6-dichloro-pregnene-20-one may be catalytically hydrogenated to produce the corresponding 5,6-dichloro-pregnane. This reaction may be chemically represented as follows:

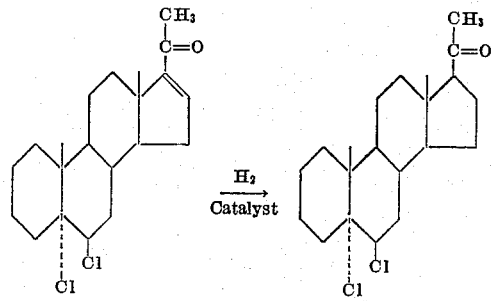

The process of the present invention is preferably carried out by dissolving or suspending the chloro-substituted pregnene in a suitable solvent such as ethyl acetate, ethanol, isopropyl alcohol, benzene, acetone, or ethyl ether. A hydrogenation catalyst is then added to the solution and the solution is agitated while subjecting it to the action of hydrogen. When the conversion is complete, the product is separated from the reaction medium by suitable means, such as by distilling the solvent from the reaction mixture and purifying the product by crystallization from a suitable solvent.

The hydrogenation catalyst is preferably used in the range of about 1 to 10% by weight based on the weight of the pregnene, although additional catalyst can be used if desired. The preferred catalysts are metals of the platinum group such as palladium supported on charcoal or palladium on barium sulfate, but other catalysts may be used such as other metals of the platinum group and oxides of these metals, Raney nickel or these metals supported on carriers.

The reaction may be carried out by using hydrogen at subatmospheric or super-atmospheric pressure, but is preferably carried out at atmospheric pressure. The temperature of the reaction may be varied to control the rate of reaction but normal room temperature is preferred, because the latter reduces the amount of equipment required.

In a preferred embodiment of this invention, 3-acetoxy-5,6-dichloro-20-keto-$\Delta^{16}$-pregnene is converted to 3-acetoxy-5,6-dichloro-20-keto-pregnane. The starting material may be obtained by low temperature chlorination of readily available plant sapogenin acetate followed by conversion to the chloro-substituted 20-keto-$\Delta^{16}$-pregnene by acylation and mild oxidation and hydrolysis. Approximately twenty parts of the 5,6-dichloro-pregnene is then suspended in ethyl acetate and one part of the palladium carbon catalyst is added. The solvent mixture is then shaken in contact with hydrogen gas under atmospheric pressure and normal room temperature. The reaction is complete in approximately 15 minutes. At this pressure, absorption ceases after one mole of hydrogen is absorbed per mole of pregnene. The product 3-acetoxy-5,6-dichloro-20-keto-pregnane is recovered in nearly quantitative yields.

The chloro substituted $\Delta^{16}$-pregnenes treated according to this invention may have various substituents in the molecule, as for example keto groups at the 11 and 20 positions, and hydroxyl groups such as at the 3, 6, 11, 13, 16, 17 and 21 positions, and acyloxy groups at the 3, 4, 5 and 21 positions. Typical examples of these compounds are:

$\Delta^{16}$-5,6-dichloro pregnene-3$\beta$-ol-11-one
$\Delta^{16}$-5,6-dichloro pregnene-3$\beta$-ol-12-one
$\Delta^{16}$-5,6-dichloro pregnene-3$\beta$-ol-11,12-dione
$\Delta^{16}$-5,6-dichloro pregnene-3$\beta$-11$\beta$-diol
$\Delta^{16}$-5,6-dichloro pregnene-3$\beta$-11$\alpha$-diol
$\Delta^{16}$-5,6-dichloro pregnene-3$\beta$,12$\alpha$-diol
$\Delta^{16}$-5,6-dichloro pregnene-3$\beta$,21-diol
$\Delta^{16}$-5,6-dichloro pregnene-3$\beta$,12$\beta$-diol The following example is given for purposes of illustration.

*Example*

A solution of 0.40 gram of $\Delta^{16}$-5,6-dichloropregnenolone acetate in 15 cc. of ethyl acetate was hydrogenated at room temperature and atmospheric pressure using 0.025 gram of a 5% palladium-charcoal catalyst. After 15 minutes, one molar equivalent of hydrogen was taken up and absorption ceased. The product was concentrated to dryness in vacuo and recrystallized from a solution of 14 cc. of methanol and 1 cc. of acetone. The product obtained in 86% yield had a melting point of 196–198° C., $[\alpha]_D = +7°$ and the mixed melting point with an authentic sample of 5,6-dichloropregnenolone acetate ($[\alpha]_D = +6.5°$) was not depressed.

The products of this invention are useful as intermediates in the preparation of hormones such as those having progestational and cortical activity. As an example, 5,6-dichloropregnenolone acetate may be converted to $\Delta^4$-pregnene-17$\alpha$,21-diol-3,20-dione (Reichstein's substance S) by acylating to produce the corresponding $\Delta^{17}$-20-enol acylate derivative which is then oxidized to the corresponding 17,20-epoxide. This latter compound is hydrolyzed to the 17α-hydroxy-20-keto compound which when reacted with bromine results in the 21-bromo compound which is converted to the 21-acyloxy compound by treatment with a salt of a lower aliphatic acid. Upon treating the 21-acyloxy compound with an oxidizing agent, the corresponding 3-keto compound is obtained which upon treatment with a dehalogenating agent forms the 21-acylate of $\Delta^4$-pregnene-17α-21-diol-3,20-dione. Upon hydrolysis with alkali this ester is cleaved to produce Reichstein's substance S.

Any departure from the above description which conforms to the present invention is intended to be included within the scope of the claims.

I claim:

1. The process which comprises treating a $\Delta^{16}$-5,6-dichloro-pregnene with hydrogen in the presence of a hydrogenation catalyst selected from the group consisting of noble metals and Raney nickel to produce the corresponding 5,6-dichloro-pregnane.

2. The process of claim 1 wherein the hydrogenation catalyst is a noble metal.

3. The process of claim 2 where the hydrogenation catalyst is of the platinum group.

4. The process of claim 2 wherein the hydrogenation catalyst is palladium supported on charcoal.

5. The process of claim 2 wherein the hydrogenation catalyst is palladium supported on barium sulfate.

6. The process of claim 2 wherein the treatment is carried out in a solvent for the pregnene.

7. The process of claim 6 wherein the solvent is ethyl acetate.

8. The process which comprises treating a $\Delta^{16}$-5,6-dichloro-pregnene with hydrogen in the presence of about 1 to 10% by weight based on the weight of the pregnene of a hydrogenation catalyst selected from the group consisting of noble metals and Raney nickel to produce the corresponding 5,6-dichloro-pregnane.

9. The process of claim 8 wherein the hydrogenation catalyst is palladium supported on charcoal.

10. The process which comprises treating a $\Delta^{16}$-5,6-dichloro-20-keto pregnene with hydrogen in the presence of about .1 to 10% by weight based on the weight of the pregnene of a hydrogenation catalyst of the platinum group to produce the corresponding 5,6-dichloro-20-keto-pregnane.

11. The process which comprises treating a $\Delta^{16}$-3-acetoxy-5,6-dichloro-20-keto-pregnene with hydrogen in the presence of about 1 to 10% by weight based on the weight of the pregnene of a hydrogenation catalyst of the platinum group to produce the corresponding 3-acetoxy-5,6-dichloro-20-keto-pregnane.

12. The process which comprises treating a $\Delta^{16}$-3-acetoxy-5,6-dichloro-20-keto-pregnene suspended in ethyl acetate with hydrogen at one atmosphere of pressure and at normal room temperature in the presence of 5% by weight based on the weight of the pregnene of palladium supported on charcoal as a hydrogenation catalyst to produce the corresponding 3-acetoxy-5,6-dichloro-20-keto-pregnane.

References Cited in the file of this patent

UNITED STATES PATENTS

| | | |
|---|---|---|
| 2,131,082 | Weijlard | Sept. 27, 1938 |
| 2,189,130 | Butenandt | Feb. 6, 1940 |
| 2,352,852 | Marker | July 4, 1944 |
| 2,369,065 | Marker | Feb. 6, 1945 |
| 2,420,489 | Marker | May 13, 1947 |